Nov. 17, 1964  A. W. GAUBATZ  3,157,442
BEARING MOUNTING
Filed Sept. 11, 1961
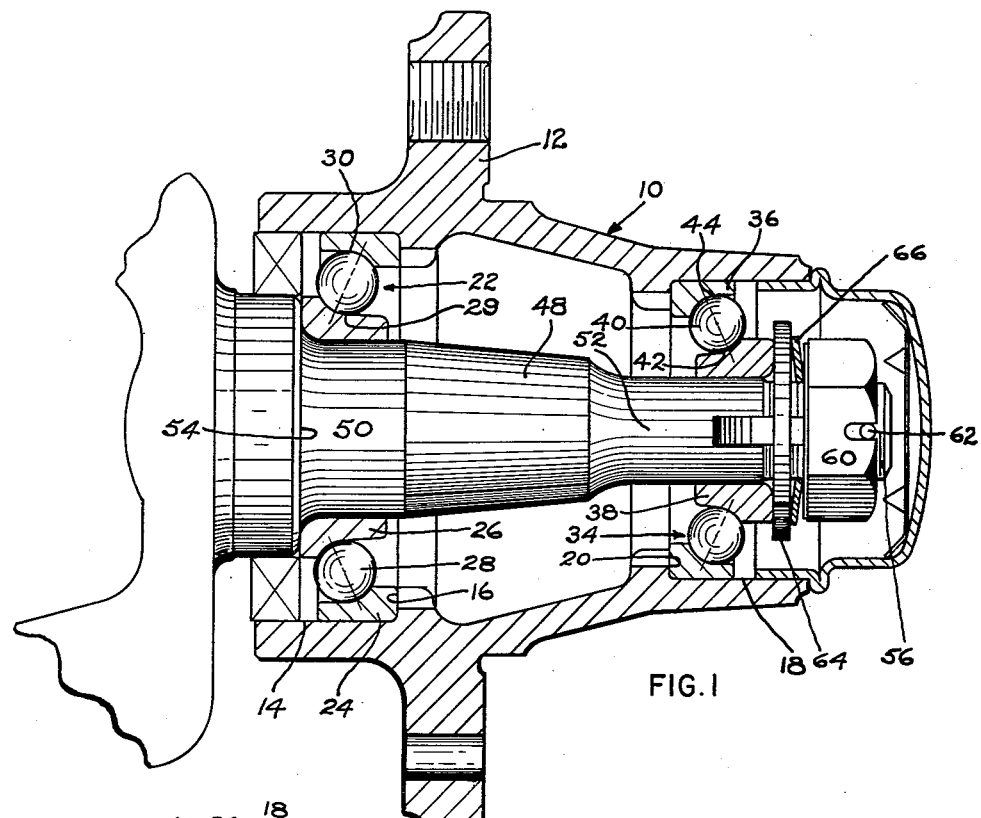
FIG. 1
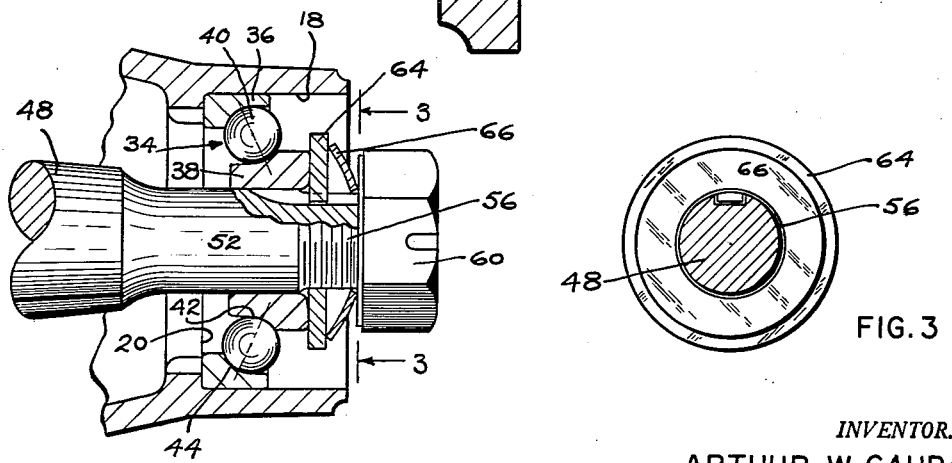
FIG. 2
FIG. 3
*INVENTOR.*
ARTHUR W. GAUBATZ
BY Edward H. Goodrich
HIS ATTORNEY

United States Patent Office 3,157,442
Patented Nov. 17, 1964

3,157,442
BEARING MOUNTING
Arthur W. Gaubatz, Indianapolis, Ind., assignor to General Motors Corporation, Detroit, Mich., a corporation of Delaware
Filed Sept. 11, 1961, Ser. No. 137,464
3 Claims. (Cl. 308—191)

This invention relates to bearing mountings and particularly to an adjustable preloading arrangement for antifriction bearings in vehicle wheels.

The front wheels of automotive vehicles are usually mounted on antifriction bearings such as ball or roller bearings axially positioned in a wheel hub. When these vehicles negotiate curves even at a moderate speed of travel, the antifriction bearings in the wheel hubs are subjected to heavy axial thrust loads. To maintain the wheel in its required axial position on its spindle or axle, each wheel hub is usually mounted on a pair of axially spaced bearings of the angular contact type which are clamped under axial preload on the spindle as by a castelated nut threaded on the spindle and secured in position by a cotter pin. To provide ample strength in the threaded connection between this nut and the spindle, it is necessary that the interfitting threads have considerable depth and lead. Consequently, after this nut has been tightened just sufficiently to position the rolling elements of the bearings in non-loaded fitting relation against their race rings, only a very slight further tightening of the nut is needed to produce the precisely required axial preload within the bearings. However, with the standard hexagonal castelated nut as commonly used, it is necessary to turn this nut through one sixth of a rotation between cotter pin alignment positions. This one sixth of a turn of the nut does not provide sufficiently close adjustment to produce the necessary preload in these bearings. Consequently, a very large number of front wheel bearings in automotive vehicles are incorrectly adjusted. If the bearings are too loose, they rapidly wear and create wheel wobble. If the bearings are too tight, the stresses of the rolling elements against the raceways may cause spalling of the raceways and the rolling elements themselves may even break thus frequently causing bearing failure.

It is, therefore, an object of my invention to provide an improved antifriction bearing mounting having a gradually and precisely adjustable preload for the bearing.

It is a further object of this invention to provide an improved preloading method for the bearings in a wheel mounting.

It is a still further object of this invention to provide an improved preloading bearing adjustment which additionally cushions sudden axial shock loads.

To these ends and also to improve generally upon devices of this character, this invention consists in the various matters and methods hereinafter described and claimed. In its broader aspects, the invention is not necessarily limited to the specific structure selected for illustrative purposes in the accompanying drawings wherein:

FIGURE 1 is a fragmentary cross sectional view through a wheel hub showing my improved mounting with the bearings in preloaded adjustment;

FIGURE 2 is a fragmentary section of the wheel hub and associated bearing showing the preloading arrangement; and FIGURE 3 is a sectional view taken along the lines 3—3 of FIGURE 2.

My invention which provides a precision adjustment for presetting and maintaining the axial preload in an antifriction bearing, is illustrated as applied to the antifriction bearing mounting of a vehicle wheel hub as the front wheel of an automobile. It will be appreciated, however, that this invention also is applicable to the preadjusting and maintaining of an axial preload on one or more antifriction bearings in other positions.

As shown, a wheel hub 10 having a suitable wheel mounting flange 12, has a rear counterbore 14 terminating in an annular hub shoulder 16 and has a front counterbore 18 terminating in an annular hub shoulder 20. An angular contact antifriction bearing, as a ball bearing 22, has its outer race ring 24 seated in the counterbore 14 against the shoulder 16. This outer race ring, which rotates with the hub 10, coaxially supports an inner race ring 26 through an intervening complement of circumferentially arranged rolling elements as balls 28 which rollably engage inner and outer raceways 29 and 30 formed on the inner and outer race rings. A dot and dash line diametrically through the balls 28 indicates the angular contact of the balls against the inner and outer raceways. A similar angular contact antifriction bearing, as a ball bearing 34, has an outer race ring 36 seated within the counterbore 18 against the shoulder 20 and has an inner race ring 38 supported coaxially of the outer race ring through an intervening circumferentially disposed complement of rolling elements, as balls 40, in rollable engagement with inner and outer raceways 42 and 44. This front bearing, which may be of smaller diameter than the rear bearing 22, has its balls 40 in opposed angular raceway contact to that of the balls in the rear bearing 22 as shown by dot-dash lines.

A spindle 48, as the front wheel spindle in a motor vehicle, has a rearward cylindrical portion 50 slidably fitted within the bore through the inner race ring 26 of the rear bearing and has a smaller forward cylindrical portion 52 slidably fitted within the bore through the inner race ring 42 of the front bearing 34. The rearward end face of the inner race ring 26 seats against an annular shoulder 54 on the spindle. The forward end of the spindle 48 has a threaded portion 56 which adjustably receives a nut 60 provided with the usual castellations through which a cotter pin 62 may be entered and passed through a transverse cotter pin hole in the spindle 48 to lock the nut in adjusted position. A thrust collar 64 slidably fitting over the threaded portion 56 has an inwardly projecting lug slidably received in a keyway in the spindle to prevent rotation of this collar relative to the spindle. A flat inner face of this collar engages the flat outer end face of the extended outer end of the inner race ring 38.

If the nut 60 is tightened against the collar 64 towards the shoulder 54, it first brings both sets of balls 22 and 40 into raceway seating positions and thereafter imparts a preload on both of the bearings 22 and 34 due to their opposed angular contact relation. However, after the sets of balls have been initially brought into raceway seating engagement, a further very slight tightening of the nut 60 produces a very rapidly increasing preload of the balls against the raceways. Since the minimum adjustment that may be accomplished through the nut 60 is from one castellation to the next to provide for cotter pin insertion, and since there is necessarily a considerable lead in the threads 56, it will be apparent that this minimum nut adjustment is in most instances far too great to produce the precisely required axial preload on the bearings 22 and 34.

To overcome this inherently defective adjustment which already exists in a tremendous number of installations, my invention provides between the nut 60 and the thrust collar 64 a dished resilient washer as a Belleville washer 66. This Belleville washer is initially provided with such inherent resiliency that when collapsed to a flat contour from its initially dished form of FIGURE 2, it will exert an axial preload on the bearings which is only slightly in excess of the required axial preload for these bearings under normal operating conditions. If desired, two or more Belleville washers may be used in opposing relation. However, this arrangement is not usually necessary and a single dished washer is sufficient. One of the important characteristics of my resilient Belleville washer resides in the fact that it requires a gradually increasing pressure to flatten the washer from its initially unloaded dished condition of FIGURE 2 to its slightly dished loaded condition of FIGURE 1. A subsequent flattening of the slightly dished washer as shown in FIGURE 1 to a completely flat condition produces only a very slight increase in preload. Consequently, when my resilient Belleville washer 56 is compressed between the thrust collar 64 and the nut 60 during the tightening of the nut, the balls are first brought into raceway interfitting relation after which the bearings are brought to the required preload just before the Belleville washer 66 is compressed to a dead flat condition. Since the preload exerted by the washer 66 does not greatly change from its slightly dished position of FIGURE 1 to that of its dead flat condition, it will be evident that the nut 60 when tightened to produce the required preload, may be aligned with the next cotter pin position without appreciably changing the preload. Consequently, the nut 60 may be easily adjusted to exert the precisely required preload and locked in adjusted position by the cotter pin 62. If desired, the nut 60 may be initially tightened to completely flatten the Belleville washer 66 and then backed off just sufficiently to locate the cotter pin 62 in locking position.

Since the normal preloaded adjustment of the nut 60 is attained when the Belleville washer 66 is very slightly dished as indicated in FIGURE 1, sudden axial thrusts against the spindle and towards the nut 60, as frequently occasioned by uneven portions in a road bed against a motor vehicle wheel, will be cushioned by further slightly collapsing the Belleville washer 66 thereby saving the bearings from undue shock and damaging wear. Due to the inherent resiliency of the Belleville washer 66, it will immediately return from its flattened condition to the slightly dished shape shown as in FIGURE 1. Additionally, the preload adjustment maintained by this Belleville washer will also compensate for bearing wear.

I claim:

1. In an adjustable antifriction wheel mounting having a pair of axially preloaded antifriction bearings provided with inner and outer race rings, a wheel hub supporting and axially positioning the outer race rings in spaced relation, a wheel spindle slidably mounted in both inner race rings and having a shoulder engaging one of the inner race rings, an adjustment nut threaded on the spindle adjacent the other inner race ring, and a dished resilient washer deformably clamped to a nearly flattened condition between the nut and said other ring to yieldably provide the desired axial preload on said bearings, said resilient washer rapidly increasing the preload while the washer is being deformed to a nearly flat condition and thereafter only slightly changing the preload when the washer is further deformed to a flat condition.

2. In an adjustable antifriction wheel mounting having a pair of axially preloaded angular contact ball bearings each of which is provided with an inner and an outer race ring, a rotatable wheel hub supporting the outer race rings in predetermined axially spaced relation, a wheel spindle slidably mounted in both inner race rings, a spindle shoulder axially locating one of the inner rings, a non-rotatable thrust collar slidably mounted on the spindle and engageable with an end of the other inner race ring, a dished axially resilient washer mounted on the spindle against the collar, said washer rapidly increasing the bearing preload when the washer is deformed to a nearly flat condition and thereafter only slightly increasing the preload when the washer is further deformed to a completely flat condition, an adjustment nut threaded on the spindle and axially deforming the dished washer to a near flat condition to provide the desired bearing preload, and means locking the nut in adjusted position.

3. In an adjustable mounting for axially preloading an angular contact antifriction bearing having a pair of relatively rotatable race rings separated by rolling elements, a member receiving and axially locating one of said race rings, a spindle axially positioned with respect to said member and slidably mounted in said other ring, a spindle nut on the spindle, a dished deformably resilient washer of uniform thickness deformably clamped between the nut and said other ring for exerting a predetermined axial preload on said bearing, said washer producing the desired preload when the washer is resiliently deformed to a nearly flat condition, the initial deformable flattening of said washer causing the washer to rapidly increase the bearing preload until the washer is deformed to a nearly flat condition after which further deformation of the washer to a flat condition only slightly changes the preload, said nut being tightened against the washer to provide the said desired preload and said nut being locked in adjusted position.

References Cited in the file of this patent

UNITED STATES PATENTS

| | | |
|---|---|---|
| 1,746,978 | Winkler | Feb. 11, 1930 |
| 1,754,892 | Hughes | Apr. 15, 1930 |
| 2,352,469 | Carlson | June 27, 1944 |
| 2,415,924 | Wells | Feb. 18, 1947 |
| 3,014,767 | Thrasher | Dec. 26, 1961 |